United States Patent
Xu et al.

(10) Patent No.: US 10,542,039 B2
(45) Date of Patent: Jan. 21, 2020

(54) SECURITY AGAINST SIDE-CHANNEL ATTACK IN REAL-TIME VIRTUALIZED NETWORKS

(71) Applicant: Nicira, Inc., Palo Alto, CA (US)

(72) Inventors: Gang Xu, Palo Alto, CA (US); Bin Qian, San Jose, CA (US); Ganesan Chandrashekhar, Campbell, CA (US); Sujatha Sundararaman, San Jose, CA (US)

(73) Assignee: Nicira, Inc., Palo Alto, CA (US)

( * ) Notice: Subject to any disclaimer, the term of this patent is extended or adjusted under 35 U.S.C. 154(b) by 102 days.

(21) Appl. No.: 15/427,760

(22) Filed: Feb. 8, 2017

(65) Prior Publication Data
US 2018/0227317 A1    Aug. 9, 2018

(51) Int. Cl.
*H04L 29/06* (2006.01)

(52) U.S. Cl.
CPC ............... *H04L 63/1466* (2013.01)

(58) Field of Classification Search
CPC ..... H04L 63/04; H04L 63/0428; H04L 63/14; H04L 63/1408; H04L 63/1416; H04L 63/1425; H04L 63/1441; H04L 63/1466; H04L 63/1475; H04L 63/1491
See application file for complete search history.

(56) References Cited

U.S. PATENT DOCUMENTS

| | | | | |
|---|---|---|---|---|
| 7,903,550 B2 * | 3/2011 | Schmidt | ............. | H04L 12/2838 370/230 |
| 7,983,305 B2 * | 7/2011 | Kim | .................... | H04W 28/06 370/329 |
| 2001/0052011 A1 * | 12/2001 | Nagao | ................... | H04L 41/024 709/224 |
| 2004/0098485 A1 * | 5/2004 | Larson | ............. | H04L 29/12066 709/227 |
| 2006/0075135 A1 * | 4/2006 | Rambhia | .................. | H04L 9/36 709/238 |
| 2009/0172171 A1 * | 7/2009 | Amir | ................... | H04L 63/0428 709/227 |
| 2010/0077225 A1 * | 3/2010 | Salgado | .................. | G06F 21/52 713/189 |
| 2010/0198980 A1 * | 8/2010 | Astrom | ................. | H04L 1/0014 709/231 |
| 2011/0228926 A1 * | 9/2011 | Shumow | ............... | G06F 21/556 380/1 |
| 2013/0151842 A1 * | 6/2013 | Yu | .......................... | H04L 9/003 713/150 |

(Continued)

FOREIGN PATENT DOCUMENTS

WO    WO-2005048006 A2 *    5/2005    ............. H04L 69/22

*Primary Examiner* — Eric W Shepperd
(74) *Attorney, Agent, or Firm* — Patterson + Sheridan, LLP

(57) ABSTRACT

Aspects of the present disclosure relate to adaptive and user-defined security against side-channel attacks in a virtual network. Traffic in the virtual network can be monitored at the hypervisor level and network security levels, such as padding and inclusion of dummy packets in the traffic stream, may be adaptively switched based on the monitored traffic information. In addition, user-defined security policies can be input to a management console. Thus, the security levels can be adaptive to real-time traffic bandwidth usage in the network and also flexibly specified by the user/administrator, which may be more efficient.

19 Claims, 3 Drawing Sheets

(56) References Cited

U.S. PATENT DOCUMENTS

| | | | |
|---|---|---|---|
| 2014/0019745 A1* | 1/2014 | Dodgson | H04L 63/065 713/150 |
| 2014/0059688 A1* | 2/2014 | Margalit | G06F 21/561 726/24 |
| 2014/0079213 A1* | 3/2014 | Jacobson | H04L 63/123 380/28 |
| 2014/0177828 A1* | 6/2014 | Loftus | H04L 9/008 380/44 |
| 2014/0201533 A1* | 7/2014 | Kruglick | H04L 63/062 713/171 |
| 2015/0033338 A1* | 1/2015 | Neve De Mevergnies | H04L 9/003 726/23 |
| 2015/0106504 A1* | 4/2015 | Astigarraga | H04L 43/16 709/224 |
| 2015/0373035 A1* | 12/2015 | Patne | H04L 63/1416 726/23 |
| 2016/0087859 A1* | 3/2016 | Kuan | H04L 43/0817 715/736 |
| 2017/0118102 A1* | 4/2017 | Majumder | G06F 9/45558 |
| 2017/0315836 A1* | 11/2017 | Langer | H04L 43/0882 |
| 2018/0039793 A1* | 2/2018 | Gordon | G06F 21/6245 |

* cited by examiner

SECURITY AGAINST SIDE-CHANNEL ATTACK IN REAL-TIME VIRTUALIZED NETWORKS

BACKGROUND

Software-defined networking (SDN) often uses network controllers to configure logical networks throughout a data center, such as a software-defined data center (SDDC). In a logical network, one or more virtual machines (VMs) or other virtualized computing instances (e.g., containers (e.g., Docker containers), data compute nodes, isolated user space instances, etc.) and one or more virtual switches may be implemented by a virtualization layer (e.g., hypervisor) running on host machines, which are physical computing devices. The host machines may be connected to a physical network via physical network interfaces (PNICs). Each VM may include one or more virtual network interfaces (VNICs) for exchanging traffic with other entities on the logical network. The VNICs may behave similarly to PNICs. Each VNIC may connect to a virtual port of a virtual switch to exchange traffic of the associated VM on the logical network. In particular, the VNIC of a VM may be responsible for exchanging packets between the VM and the hypervisor implementing the VM. The hypervisor implementing the VM may further exchange packets with hypervisors (and corresponding VMs) running on other host machines via the PNIC of its host machine.

Networks may be vulnerable to side-channel attack. Side-channel attacks are attacks that are based on side-channel information that may be retrieved even from encryption protected communication channels. Side-channel information may include information that is gained from the physical implementation of the system, for example, rather than a brute force attack based on theoretical weakness in the encryption algorithms. Side-channel information may include timing information (e.g., timing of the traffic), power consumption, electromagnetic monitoring, sound, etc. Hackers may collect and analyze the side-channel information and exploit the information to break or circumvent the security system without breaking the encryption.

In the context of network security, the traffic pattern, the traffic timing, the size of the (encrypted) packets, etc., may be sensitive data that could be used by hackers. Side-channel information leakage may result in the encrypted system being vulnerable to side-channel attacks. For example, a hacker may just sniffer the traffic on a wire without trying to decrypt the traffic. Network traffic in a SDDC may be vulnerable to side-channel attack when the underlying physical networking is insecure and easily accessible to hackers. Thus, even if the communications within the data center networks are encrypted, hackers may still be able to use side-channel attacks to collect sensitive information within the data center. Securing data and network transmissions on local area networks, encryption, and protection of sensitive data, including side channel data, continue to be an important consideration for network operators.

SUMMARY

Herein described are one or more embodiments of a method for exchanging packets in a virtual data center using dynamically switched security levels for the traffic, based on monitored traffic information and/or user-defined security parameters. The method generally includes the steps of monitoring traffic in the virtual data center to obtain traffic information; and dynamically performing at least one of: padding of encrypted packets of the traffic or including of dummy packets with the traffic, based, at least in part, on the traffic information.

Also described herein are embodiments of a non-transitory computer-readable storage medium storing instructions that, when executed by a computer system, cause the computer system to perform the method described above for exchanging packets in a virtual data center using dynamically switched security levels for the traffic, based on monitored traffic information and/or user-defined security parameters Also described herein are embodiments of a computer system programmed to carry out the method described above for exchanging packets in a virtual data center using one dynamically switched security levels for the traffic, based on monitored traffic information and/or user-defined security parameters.

DETAILED DESCRIPTION

Embodiments presented herein relate to a mitigation mechanism for protecting against side-channel attacks by dynamically switching security levels of traffic based on real-time traffic monitoring information and/or user-defined security parameter input. Accordingly, side-channel attacks may be mitigated, without degrading the system performance across the network, and security protection levels can flexibly and adaptively be provided, as further described below.

As used herein, the term "packet" may refer generally to a group of bits that can be transported together, and may be in another form, such as "frame", "message", "segment", etc. In some embodiments, the packet may include a payload (e.g., data) and header information, such as a source address corresponding to the address of the network location that generated the packet, a source port corresponding to the port of the network location that generated the packet, a destination address corresponding to the address of the destination location, a destination port corresponding to the port of the destination location, and/or a protocol used for the packet. In aspects, a packet may be encapsulated using a tunneling/encapsulation protocol, such as virtual extensible LAN (VXLAN), stateless transport tunneling (STT), generic network virtualization (Geneve), etc.

Figure 1:
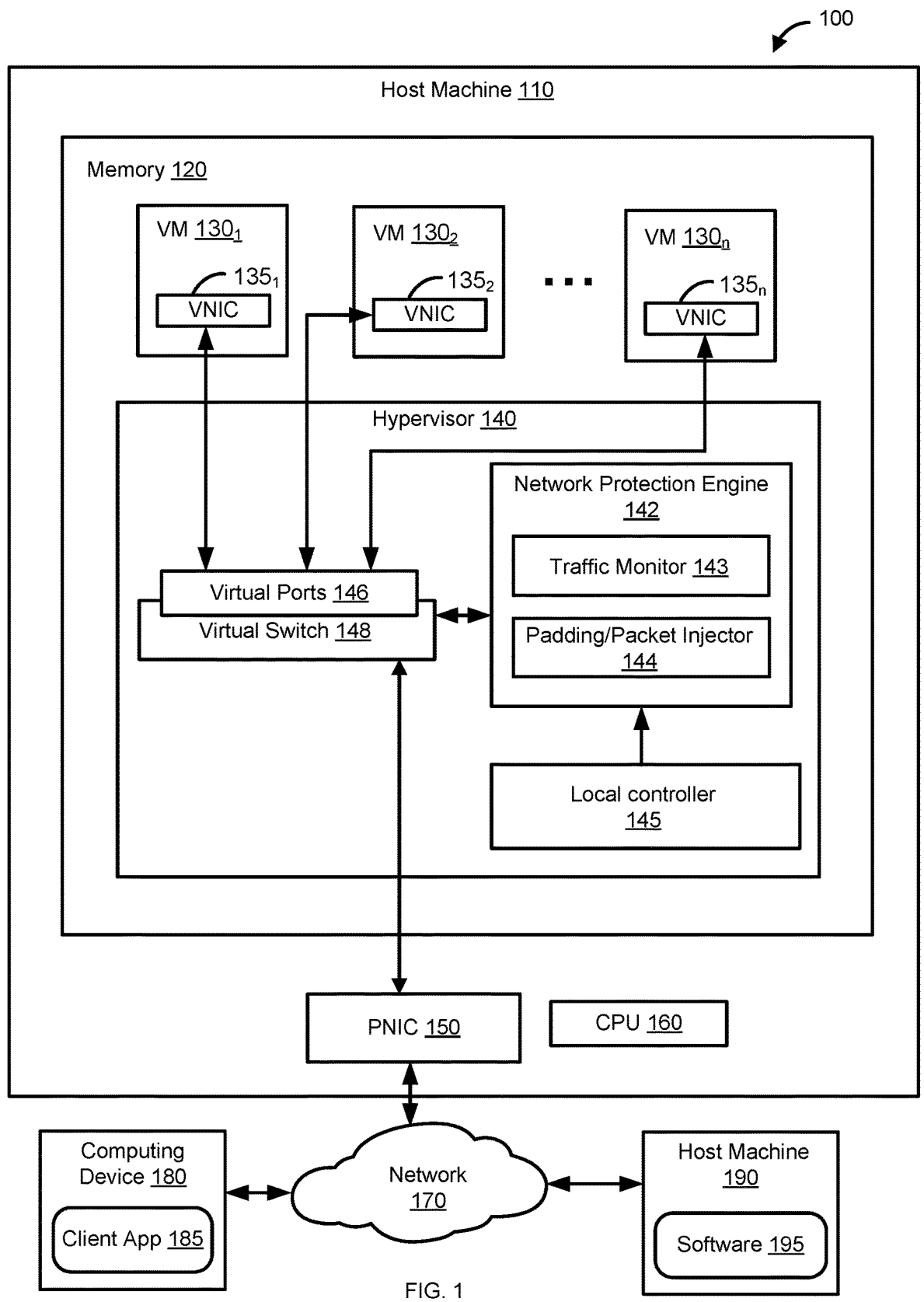
FIG. 1 illustrates components of a system in which an embodiment may be implemented.

FIG. 1 illustrates components of a system 100 in which an embodiment may be implemented. As shown, system 100 is a virtualized environment that includes host machine 110, a network 170, a host machine 190, and a computing device 180. In some embodiments, host machine 110 may be constructed on conventional hardware platforms that include one or more central processing units shown as CPU 160, memory 120, and physical network interface controllers shown as PNIC 150. CPU 160 may execute instructions stored in memory 120 that perform one or more operations described herein. Memory 120 may include, for example, one or more random access memory (RAM) modules. Although a single host machine 110, a single host machine 190, and a single computing device 180 are depicted, it should be understood that a virtualized environment may generally include any number of such devices or may not include certain such devices connected to network 170.

Host machine 190 can be configured similarly to host machine 110. Software 195 can include hypervisors, VMs, a guest operating system (OS), containers, an OS, and the like, as well as applications. Computing device 180 can execute a client application 185. Computing device 180 can include a computer, laptop, tablet, mobile device, or the like. Client application 185 can communicate using application programming interface (API) commands.

Network 170 can include various physical routers, switches, and like network appliances that facilitate communication between host machine 110, host machine 190, and computing device 180.

Host machine 110 may execute a virtualization layer shown as hypervisor 140 that is stored in memory 120. Hypervisor 140 may further implement VMs $130_1$, $130_2$, ... $130_n$. Hypervisor 140 abstracts processor, memory, storage, and/or networking resources into multiple virtual machines (e.g., VMs $130_1$, $130_2$, ... $130_n$) that run side-by-side on the same physical host machine 110. That is, the hypervisor 140 partitions physical host machine 110 into multiple secure and portable virtual machines. Each virtual machine represents a complete system—with processors, memory, networking, storage, and/or BIOS. In one embodiment, hypervisor 140 can be installed directly on host machine 110 and inserts a virtualization layer between the hardware and the operating system. Alternatively, the hypervisor 140 may run on top of a conventional operating system in host machine 110. One example of hypervisor 140 that may be used in an embodiment described herein is a hypervisor provided as part of the VMware vSphere® solution made commercially available from VMware, Inc. of Palo Alto, Calif.

The VMs $130_1$, $130_2$, ... $130_n$ may each include a software-based virtual network adapter shown as VNICs $135_1$, $135_2$, ... $135_n$ respectively, that is logically connected to a physical network adapter shown as PNIC 150 included in host machine 110 that provides network access for the VM 130. Each VNIC 135 is connected to PNIC 150 through a software-based "switch," shown as virtual switch 148 implemented by hypervisor 140. Virtual switch 148 includes virtual ports 146 as an interface between PNIC 150 and VNICs $135_1$, $135_2$, ... $135_n$. In some cases, VMs $130_1$, $130_2$, ... $130_n$ may implement one or more containers, such as Docker containers, and may be referred to as a workload or endpoint. Alternatively, in place of hypervisor, a baremetal computer operating system may be implemented on host machine 110, and in place of VMs 130, a plurality of name-space containers may be implemented by the operating system. In this case, the bare-metal operating system may implement a virtual switch to pass network communications to and from each of the containers, each of which may have its own IP and MAC addresses.

It may be desirable to protect system 100 against sidechannel attacks. Embodiments herein provide techniques for mitigating/protecting against side-channel attacks for a system, such as system 100, using dynamic switching of security levels for traffic in the system.

One technique for network security is Distributed Network Encryption (DNE) feature of the VMware NSX® virtual network solution made commercially available from VMware, Inc. of Palo Alto, Calif., which provides a software defined networking (SDN) solution that implements logical overlay networks for virtual machines and other logical network endpoints. SDN solutions enable the creation of entire networks in software that are implemented by the hypervisor layer and fully decoupled from the underlying physical network infrastructure. According to one embodiment, SDN solutions may be enhanced to protect east-west (e.g., VM to VM) traffic in the system from side-channel attacks (e.g., sniffing attacks, spoofing attacks, impersonating, etc.). The side-channel protection of the SDDC may be achieved by doing encryption and policy enforcement at the hypervisor level.

As shown in FIG. 1, hypervisor 140 includes network protection engine 142 and local controller 145. In alternate embodiments, network protection engine 142 and local controller 145 along with virtual switch 148 and physical device drivers may execute in a privileged virtual machine often referred to as a "Domain zero", "root-", or "parentpartition." Network protection engine 142 may be configured to provide security for traffic flow within system 100. For example, as shown in FIG. 1, network protection engine 142 may be in communication with virtual switch 148. In an example, network protection engine 142 may protect traffic flowing between VMs $130_1$, $130_2$, ... $130_n$, and traffic which may also flow from a VM 130 on host machine 110 via the physical network 170 to a hypervisor and VM running on another host machine (e.g., such as host machine 190 or computing device 180). Network protection engine 142 may dynamically switch security levels for the traffic. As shown in FIG. 1, network protection engine 142 may include padding/packet injector 144. Padding/packet injector 144 may add padding (e.g., additional bits) to encrypted packets of the traffic flow (e.g., to change the size of the packet) and/or padding/packet injector 144 may add dummy packets (additional packets) to the traffic stream.

Adding of padding and dummy packets may impact network efficiency or throughput of useful data. Therefore, it may be desirable to flexibly control, adjust, and/or specify the security levels for the traffic. It may be desirable for the padding patterns and dummy packets to be carefully designed. The padding patterns and dummy packets may refer, for example, to the amount and timing of the padding and dummy packets injected into the traffic stream. In one embodiment, it may be desirable to add padding and dummy packets into the traffic stream such that a relatively consistent/constant traffic pattern results regardless of the original traffic in the traffic stream, thus obscuring side-channel information.

Since the traffic and bandwidth usage are dynamic in real world applications, it may be efficient to dynamically switch the security protection levels for the traffic. For example different security protection levels may include one or more of not performing padding and dummy packet injection, performing padding and dummy packet injection, performing padding and not dummy packet injection, performing dummy packet injection and not padding, or performing different levels (e.g., amounts) of padding/dummy packet injection. For example, as shown in FIG. 1, network protection engine 142 may include traffic monitor 143. Traffic monitor 143 may monitor the traffic flow in the system 100 (e.g., periodically). In aspects, traffic monitor 143 may monitor traffic anywhere along the data pipeline (e.g., data path, I/O chain) such as, for example, before the virtual switch 148, at the virtual switch 148, after the virtual switch 148, or before the PNIC 150. The traffic monitor 143 may obtain traffic information (e.g., corresponding to traffic of VMs 130), such as the bandwidth usage. The traffic information may be used by the network protection engine 142 to dynamically switch the security protection levels for the traffic in the system 100. For example, padding/packet injector 144 may use the monitored traffic information to determine the padding and dummy packet patterns, as will be discussed in more detail below with respect to FIGS. 3 and 4.

As shown in FIG. 1, hypervisor 140 may include a local controller 145. A user of the system 100, such as a network administrator, may specify user-defined security parameters input, such as security policies or rules, which may be received and processed at the system 100 by local controller 145. For example, the network administrator may interact (e.g., using a user interface) with a manager (not shown) which may include one or more computing devices or virtual machines that implement management plane functions. The manager may be coupled to a central controller (not shown), which may include one or more network controller nodes (e.g. central controller computers or virtual machines or containers or other logical compute instances that implement central control plane functions). In some embodiments, the central controller may include both management plane and central control plane functions (e.g., combined or as separate applications or functions). The central controller may communicate the user-defined security parameters input, such as security policies or rules to the local controller 145, e.g., via an application programming interface, such as a RESTful interface. An example of a user-defined security parameter may be to specify a particular type of traffic flow, or traffic to or from a particular VM, etc., to protect against side-channel information leaks. The user-defined security parameters input may be pushed to the local controller 145 and enforced, for example, by the network protection engine 142.

Thus, network protection engine 142 may dynamically switch the security protection levels based on user-defined security parameter input as well as the monitored traffic information. This may provide an adaptive and user-defined mechanism to mitigate side-channel attacks without degrading the system performance across the network as well as providing user flexibility to specify protection levels.

Figure 2:
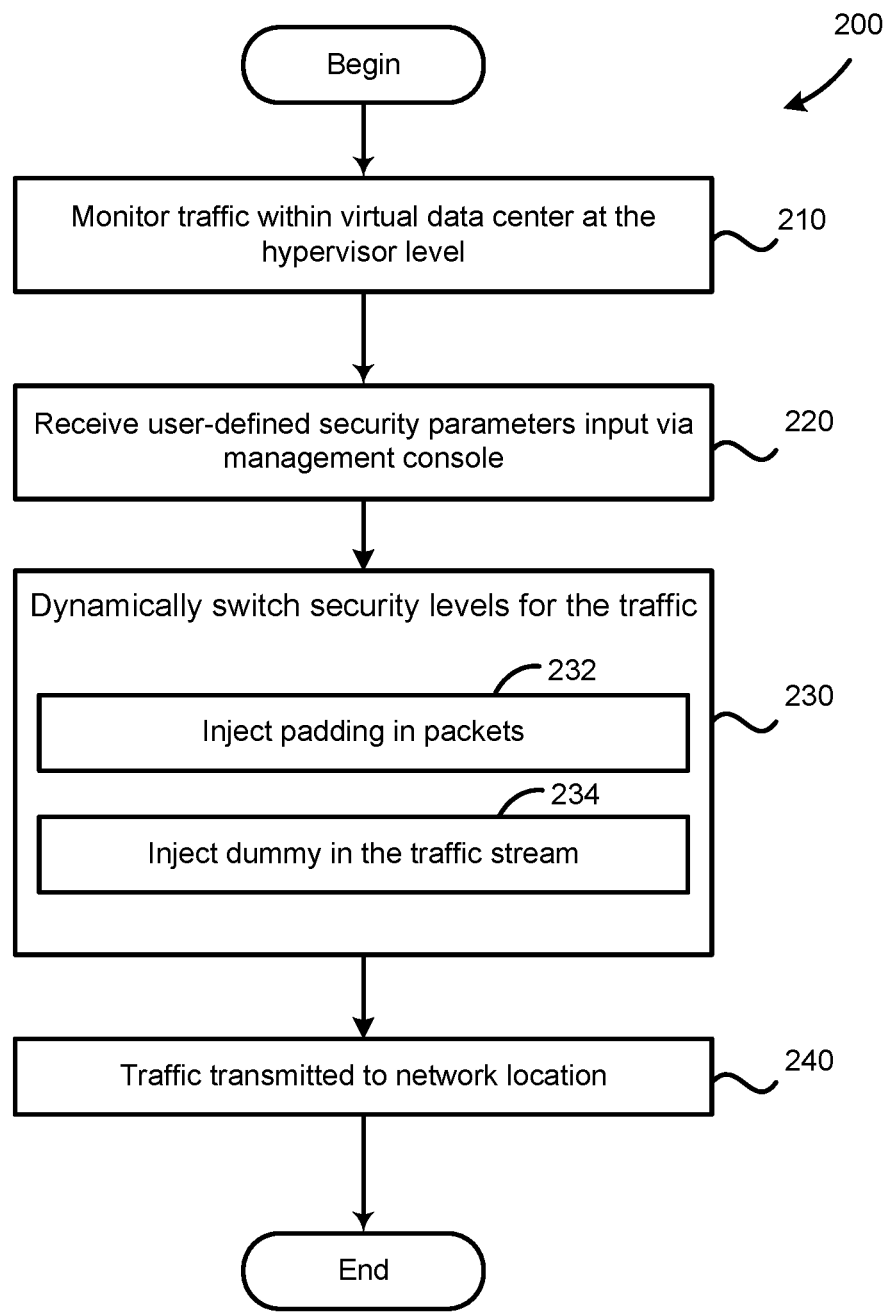
FIG. 2 is a flow diagram illustrating example operations performed by a virtual switch for exchanging packets in a logical network, according to an embodiment.

FIG. 2 illustrates example operations 200 for exchanging packets in a logical network, according to an embodiment. The operations 200 may be performed, for example, at a hypervisor (e.g., such as hypervisor 140). The operations 200 begin, at 210, by traffic monitor 143 monitoring traffic in the virtual data center to obtain traffic information (e.g., traffic bandwidth usage). At 220, management console 145 may receive user-defined security parameter input (e.g., by the user or administrator of the network). At 230, network protection engine 142 may dynamically switch security levels for the traffic based on at least one of: the traffic information or the user-defined security parameter input. For example, at 232, padding/packet injector 144 may inject padding in packets (e.g., encrypted packets) of the traffic stream and/or at 234, padding/packet injector 144 may inject dummy packets in the traffic stream. At 240, the traffic is transmitted to a network location.

According to certain aspects, the user-defined security parameter input may indicate to use—and the traffic monitor 143 may perform—context-based, medium access control (MAC)-based, transmission control protocol (TCP) header-based, Internet protocol (IP)-based, and/or hypertext transfer protocol (HTTP)-based, etc., monitoring of the traffic. The monitoring may also be based on context information. Context information may be related to the user the traffic is associated with, the application the traffic is associated with, etc. Context information may be received from an agent within a VM, from within the hypervisor, etc.

Figure 3:
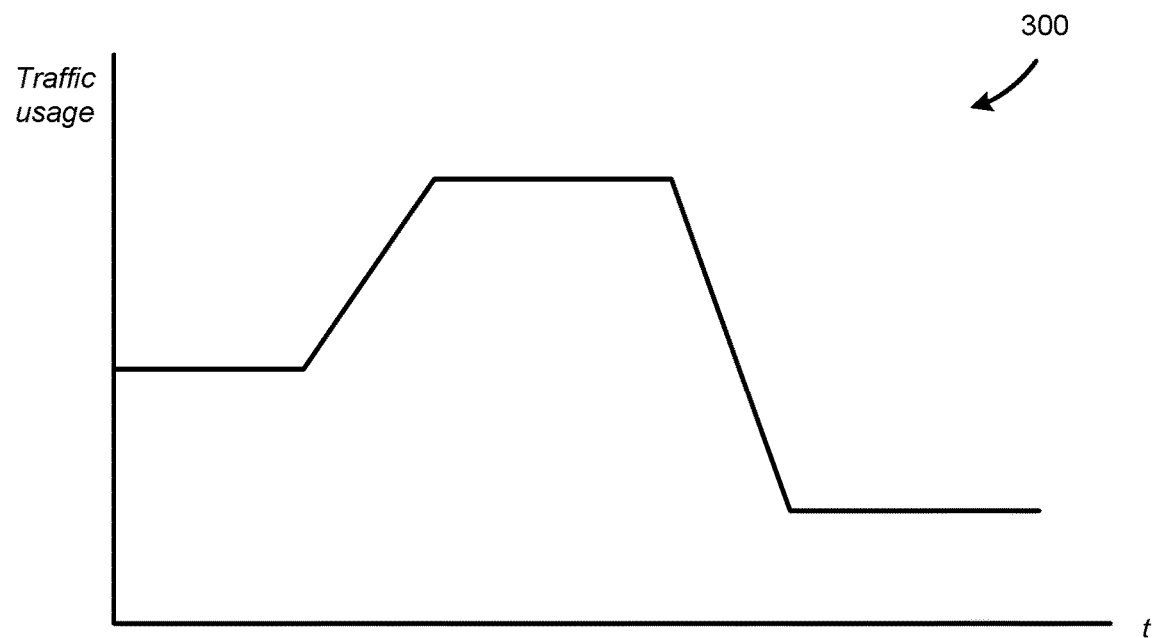
FIG. 3 is a graph of example monitored traffic bandwidth usage, according to an embodiment.
Figure 4:
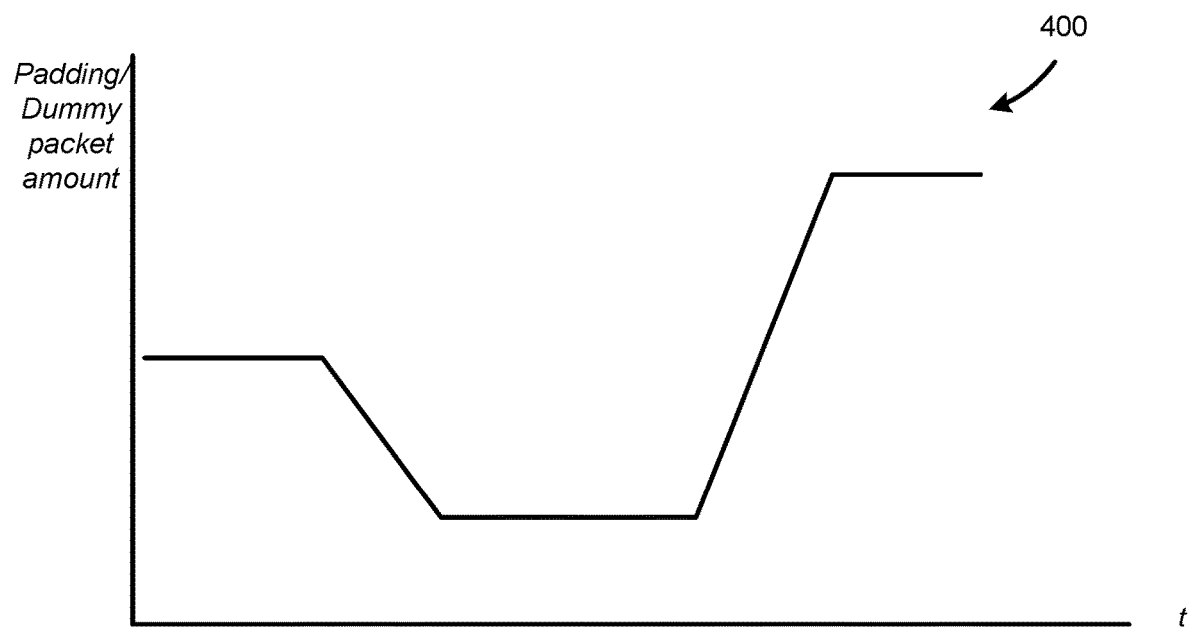
FIG. 4 is a graph of example security level switching based on the monitored traffic bandwidth usage of FIG. 3, according to an embodiment.

According to certain aspects, network protection engine 142 may dynamically switch the security levels for the traffic by dynamically adding more padding to encrypted packets of the traffic or dynamically including more dummy packets with the traffic for lower bandwidth usages than for higher bandwidth usages of the traffic, as shown in FIGS. 3 and 4. Similarly, network protection engine 142 may dynamically switch the security levels for the traffic by dynamically adding less padding to encrypted packets of the traffic or dynamically including less dummy packets with the traffic for higher bandwidth usages than for lower bandwidth usages of the traffic. For example, FIG. 3 is a graph 300 of example monitored traffic bandwidth usage and FIG. 4 is a graph 400 of example security level switching based on the monitored traffic bandwidth usage of FIG. 3, according to an embodiment. As shown in FIG. 4, the amount of padding/dummy packets injected in the traffic stream over time may be approximately inversely proportional to the changes in the traffic bandwidth usage over time shown in FIG. 3.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The computer readable media may be non-transitory. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for exchanging packets in a virtual data center, the method comprising:
   monitoring traffic in the virtual data center to obtain real-time bandwidth usage of the traffic;
   determining a security protection level for the traffic based, at least in part, on the real-time bandwidth usage of the traffic; and
   dynamically performing at least one of: padding of encrypted packets of the traffic or including of dummy packets with the traffic, at least in part in response to the real-time bandwidth usage of the traffic and the security protection level.

2. The method of claim 1, further comprising:
   receiving user-defined security parameter input, wherein the dynamically performing is based, at least in part, on the user-defined security parameter input.

3. The method of claim 1, wherein the monitoring the traffic and the dynamically performing is by one or more hypervisors of the virtual data center.

4. The method of claim 1, wherein the dynamically performing comprises at least one of: dynamically adding more padding to encrypted packets of the traffic for lower bandwidth usages than for higher bandwidth usages of the traffic or dynamically including more dummy packets with the traffic for lower bandwidth usages than for higher bandwidth usages of the traffic.

5. The method of claim 1, wherein the monitoring the traffic comprises at least one of: context-based monitoring, medium access control (MAC)-based monitoring, or Internet protocol (IP)-based monitoring of the traffic.

6. A non-transitory computer readable medium comprising instructions to be executed in a computer system, wherein the instructions when executed in the computer system perform a method for exchanging packets in a virtual data center, the method comprising:
   monitoring traffic in the virtual data center to obtain real-time bandwidth usage of the traffic;
   determining a security protection level for the traffic based, at least in part, on the real-time bandwidth usage of the traffic; and
   dynamically performing at least one of: padding of encrypted packets of the traffic or including of dummy packets with the traffic at least in part in response to the real-time bandwidth usage of the traffic and the security protection level.

7. The non-transitory computer readable medium of claim 6, wherein:
   the method further comprises receiving user-defined security parameter input; and
   the dynamically performing is based, at least in part, on the user-defined security parameter input.

8. The non-transitory computer readable medium of claim 6, wherein the monitoring the traffic and dynamically performing is by one or more hypervisors of the virtual data center.

9. The non-transitory computer readable medium of claim 6, wherein the dynamically performing comprises at least one of: dynamically adding more padding to encrypted packets of the traffic for lower bandwidth usages than for higher bandwidth usages of the traffic or dynamically including more dummy packets with the traffic for lower bandwidth usages than for higher bandwidth usages of the traffic.

10. The non-transitory computer readable medium of claim 6, wherein the monitoring the traffic comprises at least one of: context-based monitoring, medium access control (MAC)-based monitoring, or Internet protocol (IP)-based monitoring of the traffic.

11. A computer system comprising at least one processor coupled with a memory, wherein the memory stores system software for the at least one processor to execute a method for exchanging packets in a virtual data center, the method comprising:
  monitoring traffic in the virtual data center to obtain real-time bandwidth usage of the traffic;
  determining a security protection level for the traffic based, at least in part, on the real-time bandwidth usage of the traffic; and
  dynamically performing at least one of: padding of encrypted packets of the traffic or including of dummy packets with the traffic, at least in part in response to the real-time bandwidth usage of the traffic and the security protection level.

12. The computer system of claim 11, wherein:
  the method further comprises receiving user-defined security parameter input; and
  the dynamically performing is based, at least in part, on the user-defined security parameter input.

13. The computer system of claim 11, wherein the monitoring the traffic and the dynamically performing is by one or more hypervisors of the virtual data center.

14. The computer system of claim 11, wherein the dynamically performing comprises at least one of: dynamically adding more padding to encrypted packets of the traffic for lower bandwidth usages than for higher bandwidth usages of the traffic or dynamically including more dummy packets with the traffic for lower bandwidth usages than for higher bandwidth usages of the traffic.

15. The computer system of claim 11, wherein the monitoring the traffic comprises at least one of: context-based monitoring, medium access control (MAC)-based monitoring, or Internet protocol (IP)-based monitoring of the traffic.

16. A computer system comprising:
  means for monitoring traffic in the virtual data center to obtain real-time bandwidth usage of the traffic;
  means for determining a security protection level for the traffic based, at least in part, on the real-time bandwidth usage of the traffic; and
  means for dynamically performing at least one of: padding of encrypted packets of the traffic or including of dummy packets with the traffic, at least in part in response to the real-time bandwidth usage of the traffic and the security protection level.

17. The computer system of claim 16, wherein:
  the computer system further comprises means for receiving user-defined security parameter input; and
  the dynamically performing is based, at least in part, on the user-defined security parameter input.

18. The computer system of claim 16, wherein the means for dynamically performing comprises at least one of: means for dynamically adding more padding to encrypted packets of the traffic for lower bandwidth usages than for higher bandwidth usages of the traffic or means for dynamically including more dummy packets with the traffic for lower bandwidth usages than for higher bandwidth usages of the traffic.

19. The computer system of claim 16, wherein monitoring the traffic comprises at least one of: context-based monitoring, medium access control (MAC)-based monitoring, or Internet protocol (IP)-based monitoring of the traffic.

* * * * *